United States Patent

Nakamura

[19]

[11] Patent Number: 5,883,947
[45] Date of Patent: Mar. 16, 1999

[54] METHOD OF AND APPARATUS FOR CONNECTING TERMINALS BETWEEN STATIONS

[75] Inventor: Toshio Nakamura, Tokyo, Japan

[73] Assignee: NEC Corporation, Tokyo, Japan

[21] Appl. No.: 700,923

[22] Filed: Aug. 23, 1996

[30] Foreign Application Priority Data

Oct. 5, 1995 [JP] Japan .................................. 7-258930

[51] Int. Cl.⁶ ............................ H04M 3/42; H04M 7/00
[52] U.S. Cl. ......................... 379/202; 379/207; 379/220
[58] Field of Search .................................. 379/202, 207, 379/215, 205, 206, 93.35, 112, 114, 115, 121, 127, 219, 220, 221

[56] References Cited

U.S. PATENT DOCUMENTS

| 4,873,517 | 10/1989 | Baratz et al. | 379/220 |
| 5,408,526 | 4/1995 | McFarland et al. | 379/202 |
| 5,619,561 | 4/1997 | Reese | 379/205 |

FOREIGN PATENT DOCUMENTS 3-214953  1/1990  Japan .
7-74832   9/1993  Japan .

*Primary Examiner*—Ahmad F. Matar
*Assistant Examiner*—Benny Q. Tieu
*Attorney, Agent, or Firm*—Whitham, Curtis & Whitham

[57] ABSTRACT

The present invention provides a method of and an apparatus for connecting terminals between switches wherein a connection of terminals via a plurality of switches can be established using a necessary minimum number of lines. In order to additionally connect, where terminal 1 and terminal 2 are interconnected via a plurality of switches and lines, terminal 3 to the connection, information, with which it can be identified which one of two switches is nearer to the added terminal, is stored into a short distance memory of each of the switches, and the terminal connection between the switches is adjusted using the short distance memories so that, from among the transit switches and transit lines, the line of the switch which is nearest to the added terminal may be connected to the added terminal. Or, information, with which, for each of occupied terminals, a switch or switches in which a called terminal or terminals are accommodated can be identified, is stored into the connected switch memory of each of the switches, and the terminal connection is adjusted between the switches using the connected switch memories so that, when one of the originating terminal and the terminating terminal and the added terminal are accommodated in one of the switches, the line of the switch and the added terminal may be connected to each other.

6 Claims, 6 Drawing Sheets

SHORT DISTANCE MEMORY
[ SWITCH (A) ]

| ADDED TELEPHONE OFFICE | TRANSIT SWITCH | | |
|---|---|---|---|
| | SWITCH (A) | SWITCH (B) | SWITCH (C) |
| SWITCH (A) | — | INFORMATION 0 | — |
| SWITCH (B) | — | INFORMATION 1 | — |
| SWITCH (C) | — | INFORMATION 1 | — |

INFORMATION 0 = SELF SWITCH IS /1 = CALLED SWITCH IS SHORT DISTANCE
SHORT DISTANCE

FIG.3A

SHORT DISTANCE MEMORY
[ SWITCH (B) ]

| ADDED TELEPHONE OFFICE | TRANSIT SWITCH | | |
|---|---|---|---|
| | SWITCH (A) | SWITCH (B) | SWITCH (C) |
| SWITCH (A) | INFORMATION 1 | — | INFORMATION 0 |
| SWITCH (B) | INFORMATION 0 | — | INFORMATION 0 |
| SWITCH (C) | INFORMATION 0 | — | INFORMATION 1 |

INFORMATION 0 = SELF SWITCH IS /1 = CALLED SWITCH IS SHORT DISTANCE
SHORT DISTANCE

FIG.3B

CONNECTED SWITCH MEMORY
[ SWITCH (A) ]

| | CONNECTED TELEPHONE STATION INFORMATION |
|---|---|
| TELEPHONE 1 | 13 [ SWITCH (C) STATION NUMBER] |
| | |
| TELEPHONE N | |

FIG.3C

METHOD OF AND APPARATUS FOR CONNECTING TERMINALS BETWEEN STATIONS

BACKGROUND OF THE INVENTION

1. Field of the Invention

This invention relates to a terminal connection method for a switch, and more particularly to a method of and apparatus for connecting terminals where a network is formed from a plurality of switches.

2. Description of the Related Art

Conventionally, in order to connect terminals via a plurality of switches, a line from an originating switch in which a terminal which has developed a request for connection is accommodated to a terminating switch in which another terminal to which the terminal is to be connected is accommodated is acquired, and connection request information is sent out from the originating switch to the terminating switch.

More particularly, as shown as a conventional example in FIG. 1(a), when a calling person performs, while telephone 64 and telephone 65 are first connected to each other via switches 61, 62 and 63 and lines 67 and 68, a dialing operation in order to call telephone 66 which belongs to switch 63 from telephone 64, dial information is sent to switch 63 via line 69 and switch 62 as well as line 70.

Then, switch 63 connects telephone 66 corresponding to the received dial information to line 70 to establish three-party communication by telephones 64, 65 and 66. In this instance, four lines are used to interconnect telephones 64, 65 and 66.

Meanwhile, as shown as another conventional example in FIG. 1(b), when telephone 64 and telephone 65 are first in a mutually connected condition via switches 61, 62 and 63 and lines 67 and 68 and then a calling person performs a dialing operation in order to call telephone 66 which belongs to switch 62 from telephone 64, dial information is sent to switch 62 via line 69.

Then, switch 62 connects telephone 66 corresponding to the received dial information to line 69 to establish three-party communication by telephones 64, 65 and 66. In this instance, three lines are used to interconnect telephones 64, 65 and 66.

Here, the problem of the prior art resides in that, as the scale of the switched network increases, the number of times by which a situation that an all busy condition of lines is encountered and a necessary service cannot be provided when it is required occurs increases. Accordingly, in order to improve the service capability, a large number of line equipments must be installed.

The reason is: in order to connect terminals via a plurality of switches, a line from an originating switch in which a terminal which has developed a request for connection is accommodated to a terminating switch in which another terminal to which the origination terminal is to be connected is accommodated is acquired, and connection request information is sent out from the originating switch to the terminating switch. Therefore, as the number of switches via which the connection request information is transmitted increases, also the number of lines used increases, and also the probability that an all busy condition is encountered increases.

SUMMARY OF THE INVENTION

It is an object of the present invention to provide a method of and an apparatus for connecting terminals between switches wherein a connection of terminals via a plurality of switches can be established using a necessary minimum number of lines.

According to an aspect of the present invention, a method of connecting terminals between switches in a connection processing method applied when, while an originating terminal and a terminating terminal are connected to each other via a plurality of switches and lines, an added terminal is to be additionally connected to the connection between the terminals, comprises the steps of storing information, with which it can be identified which one of two switches connected to each other by a line is nearer to the added terminal, into a short distance memory of each of the switches, and adjusting the terminal connection between the switches using the short distance memories so that, from among the transit switches and transit lines, the line of the switch which is nearest to the added terminal may be connected to the added terminal.

The method of connecting terminals between switches may alternatively comprise the steps of storing information, with which, for each of occupied terminals, a switch or switches in which a called terminal or terminals are accommodated can be identified, into a connected switch memory of each of the switches, and adjusting the terminal connection between the switches using the connected switch memories so that, when one of the originating terminal and the terminating terminal and the added terminal are accommodated in one of the switches, the line of the switch and the added terminal may be connected to each other.

According to another aspect of the present invention, an apparatus for connecting terminals between switches in a connection processing apparatus applied when, while an originating terminal and a terminating terminal are connected to each other via a plurality of switches and lines, an added terminal is to be additionally connected to the connection between the terminals, comprises a short distance memory for each of the switches for storing information with which it can be identified which one of two switches connected to each other by a line is nearer to the added terminal, and means for adjusting the terminal connection between the switches using the short distance memories so that, from among the transit switches and transit lines, the line of the switch which is nearest to the added terminal may be connected to the added terminal.

The apparatus for connecting terminals between switches may alternatively comprise a connected switch memory for each of the switches for storing information with which a switch or switches in which a occupied terminal or terminals are accommodated can be identified, and means for adjusting the terminal connection between the switches using the connected switch memories so that, when one of the originating terminal and the terminating terminal and the added terminal are accommodated in one of the switches, the line of the switch and the added terminal may be connected to each other.

The short distance memory for each of the switches for storing information, with which a switch or switches in which a occupied terminal or terminals are accommodated can be identified, may include a short distance memory in which one of the switches which accommodates a terminal to be additionally connected to the occupied interconnection and those transit switches via which the terminals are to be interconnected between the switches are stored in a corresponding relationship as fixed information wherein information 0 represents that the self switch is at a short distance whereas information 1 represents that a called switch is at a short distance.

Or, the connected switch memory for each of the switches for storing information, with which a switch or switches in which a occupied terminal or terminals are accommodated can be identified, may includes a connected switch memory into which, for all terminals accommodated in the switch, station information of a called terminal or terminals in the interconnection is registered at any time and by and into which the station information is discriminated, when the called terminal is an originating terminal, from a dialing operation number upon origination, but when the called terminal is a terminating terminal, from information received by an originator number notification service and stored.

BRIEF DESCRIPTION OF THE DRAWINGS

FIGS. 3(a), 3(b) and 3(c) are tables showing memory constructions in an embodiment of a method of connecting terminals between switches of the present invention;

DESCRIPTION OF THE PREFERRED EMBODIMENTS

An embodiment of the present invention is described in detail below with reference to the drawings.

Figure 1A:
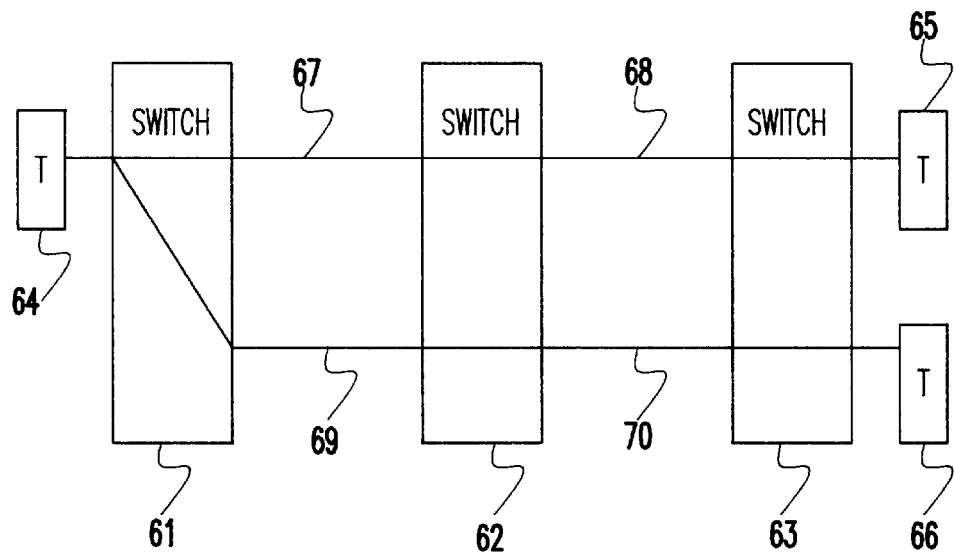
FIGS. 1(a) and 1(b) are block diagrams showing different conventional methods of connecting terminals between switches.
Figure 1B:
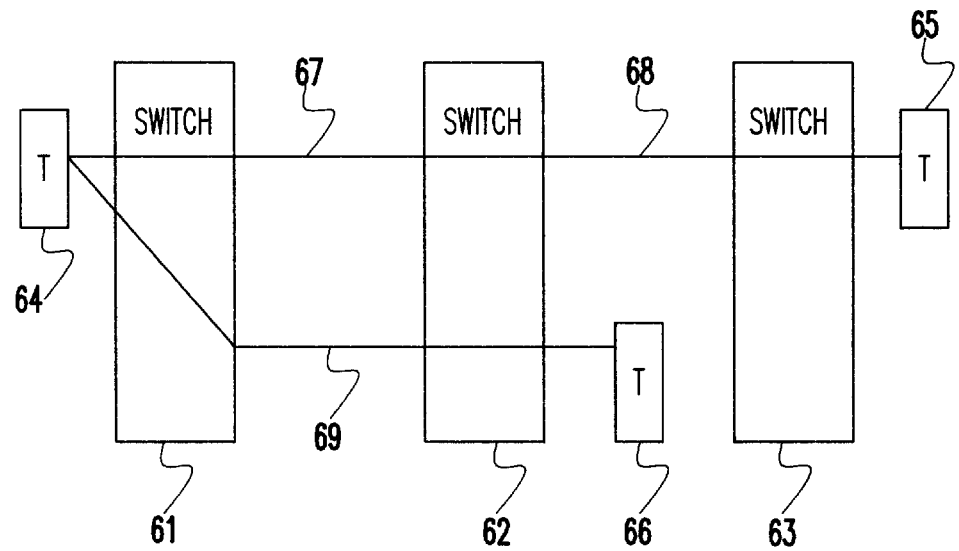
Figure 2:
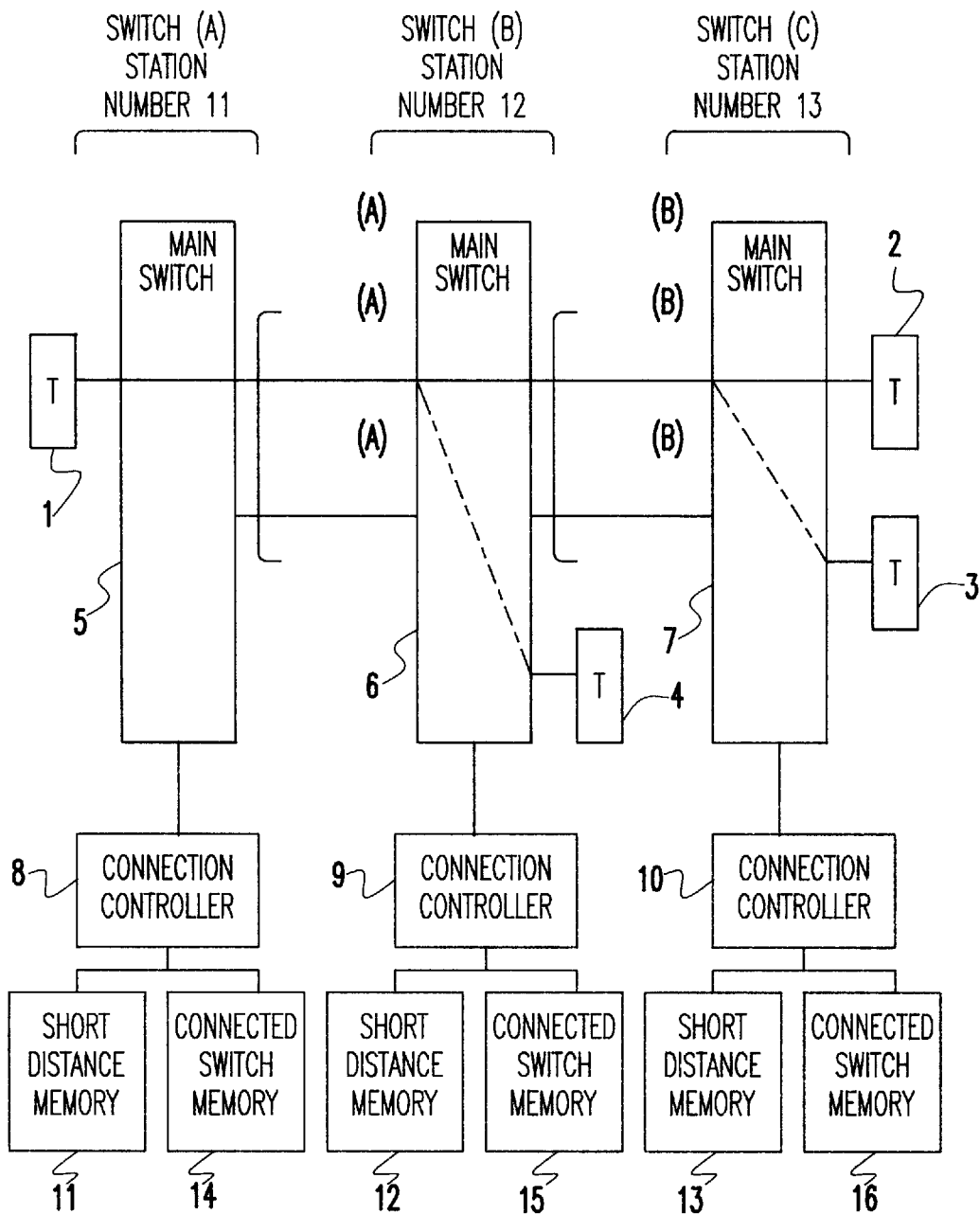
FIG. 2 is a block diagram showing an embodiment of an apparatus for connecting terminals between switches of the present invention.

FIG. 2 is a block diagram showing a construction of an embodiment of an apparatus for connecting terminals between switches according to the present invention, and shows an example of a construction for a network system wherein a certain telephone is connected to another telephone via three switches.

FIG. 2 shows a construction of associated apparatus and connections of them. In FIG. 2, telephones 1, 2, 3 and 4 are accommodated in and connected to main switches 5, 6 and 7 of different switches.

Each main switch is controlled by one of connection controllers 8, 9 and 10 to which it is connected, and interconnects a telephone and a line or interconnects a line and another line.

Switches (A), (B) and (C) are connected to each other by lines (A) and (B) and main switches 5, 6 and 7, respectively. Each line is formed from a service line (A) or (B) for use for mutual speech and a control line (A) or (B) for communicating control signals between switches.

Each of the connection controllers controls the associated main switch with dial information and so forth received from a telephone or via a control line using a program and data stored in the apparatus to perform switching processing such as connection and/or disconnection and so forth.

Short distance memories 11, 12 and 13 and connected switch memories 14, 15 and 16 are used in order to adjust it between the switches by which one of the switches connection between a telephone and a line should be performed.

As shown in FIGS. 3(a) and 3(b), in the present embodiment, each of the short distance memories is constructed such that a switch in which a called telephone to be called by originating processing of a self switch (processing generally of receiving dial information from a private telephone or line accommodated in the switch and calling a called telephone indicated by the dial information as an added telephone) is accommodated is referred to as "added telephone office". Meanwhile, a called party switch in which a line interconnected already to the private telephone (or the line) of the self switch which has requested for the originating processing is accommodated is referred to as "transit switch". Thus, each of the short distance memories described above stores information for identification of which one of the distance from the self switch to the "added telephone office" and the distance from the "transit switch" to the "added telephone office" is a shorter distance.

Further, the short distance memory provided in one of the switches stores all of the switches in the network as "added telephone offices" and stores, as a "transit switch", only a line accommodated in the self switch, that is, only the called switch accommodated in the self switch. Then, information corresponding to them (information 0=self switch is at a short distance; information 1=the called switch is at a short distance) is stored as fixed information in the short distance memory.

FIG. 3(a) shows short distance memory 11 provided in switch (A), and FIG. 3(b) shows short distance memory 12 provided in switch (B).

Since only switch (B) is connected as a called switch to switch (A) as shown in FIG. 2, only information corresponding to switch (B) as a transit switch is stored in the short distance memory provided in switch (A). Meanwhile, since switches (A) and (C) are connected as called switches to switch (B), information corresponding to switches (A) and (C) as transit switches is stored in the short distance memory provided in switch (B).

As can be seen from FIG. 3(a), when a telephone of switch (A) is to be connected additionally, the short distance memory of switch (A) holds information 0 for it since switch (A) has a shorter distance than switch (B). Similarly, when a telephone of switch (B) is to be connected additionally, since switch (A) has a longer distance than switch (B), the short distance memory holds information 1 for it. Further, when a telephone of switch (C) is to be connected additionally, since switch (A) has a longer distance than switch (B), the short distance memory holds information 1 for it.

As can be seen from FIG. 3(b), when a telephone of switch (A) is to be connected additionally, since switch (B) has a longer distance than switch (A), the short distance memory of switch (B) holds information 1 for it. Similarly, when a telephone of switch (B) is to be connected additionally, since switch (B) has a shorter distance than switch (A), the short distance memory of switch (B) holds information 0 for it. Further, when a telephone of switch (C) is to be connected additionally, since switch (B) has a shorter distance than switch (A), the short distance memory of switch (B) holds information of 0 for it. Also a result of similar comparison with switch (C) is illustrated in FIG. 3(b).

Also where the switches are connected in a loop, stored information of the short distance memories is obtained in a similar manner as described above. However, since connections in two directions are available, the short distance memories may possibly hold, for comparison of information, information indicating whether a direction in which a shorter line route is exhibited is taken or a direction in which a smaller number of lines is used is taken.

The short distance memory of switch (C) holds a similar construction. However, since this is not used for description of the present embodiment, description of it is omitted herein.

The construction of connected switch memory 14 of switch (A) is illustrated in FIG. 3(*c*). As seen from FIG. 3(*c*), station information of a called telephone or telephones in interconnection is registered, for all telephones accommodated in switch (A) (intra-office telephones), into called switch memory 14 of switch (A) at any time.

In the present embodiment, since telephone 1 and telephone 2 are interconnected and are proceeding with a two-party communication, the station number of switch (C), that is, 13, is registered in connected switch memory 14 of switch (A) corresponding to telephone 1 of the connected switch memory. Registration of the station number is performed such that, when telephone 1 is an originating terminal, the station number is identified and registered from a number dialed upon origination, but when telephone 1 is a terminating terminal, the station number is identified and registered from information sent from switch (C) to switch (A) by a service generally called originator number notification.

The connected switch memories of switches (B) and (C) are constructed in a similar manner. However, since they are not used for description of the present embodiment, description of them is omitted herein.

Next, operation of the embodiment of the present invention is described in detail with reference to the drawings.

Figure 4:
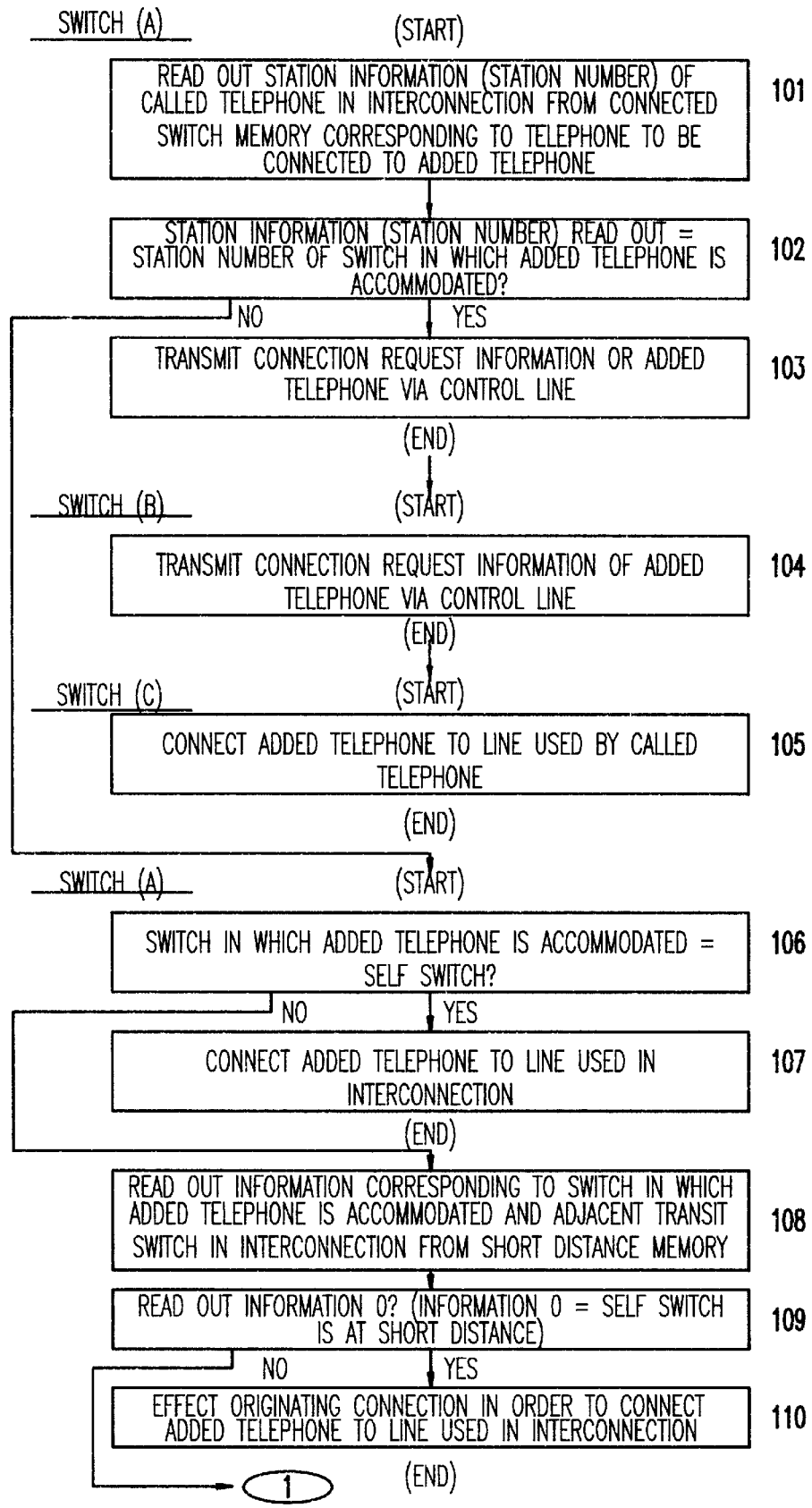
FIG. 4 is a first part of a flow chart illustrating operation of the embodiment of a method of connecting terminals between switches of the present invention.
Figure 5:
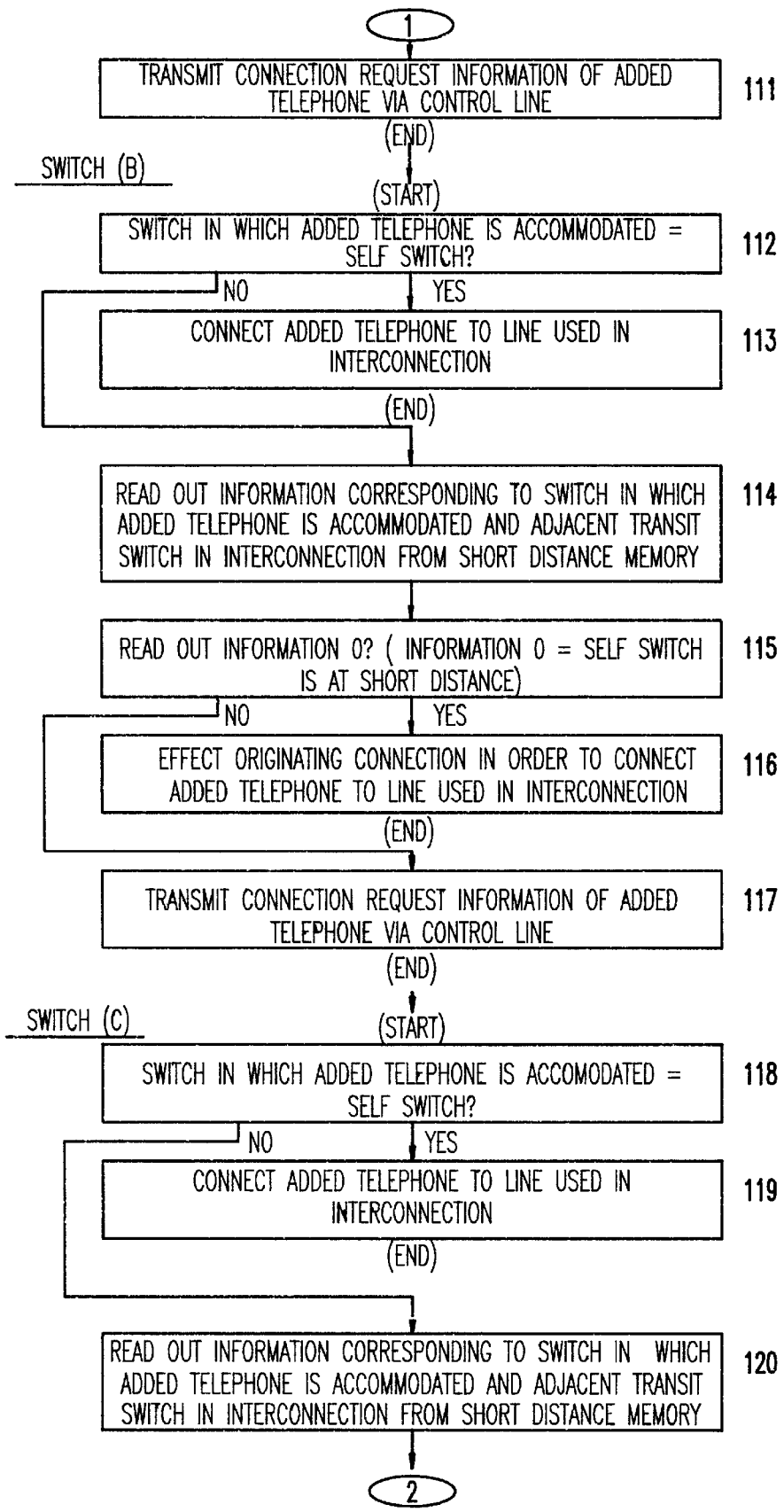
FIG. 5 is a second part of the flow chart illustrating operation of the embodiment of a method of connecting terminals between switches of the present invention.
Figure 6:
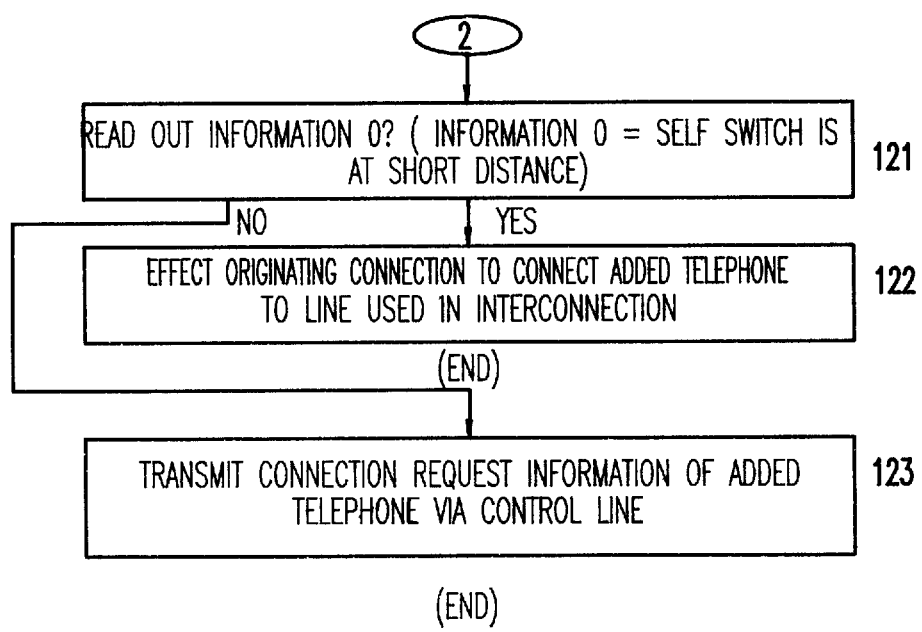
FIG. 6 is a third part of the flow chart illustrating operation of the embodiment of a method of connecting terminals between switches of the present invention.

FIGS. 4 to 6 are flow charts illustrating an embodiment of a method of connecting terminals between switches of the present invention. Principal operation steps of a method of connecting terminals between switches in the switched network system of the present embodiment so that a switch which is positioned nearest to an added terminal connects the added terminal and a line will be described with reference to FIGS. 4 to 6.

It is to be noted that, since fixed information of a short distance memory is stored by a maintenance engineer using a maintenance console or a like apparatus and, as information of a connected switch memory, a station number of dial information received by a switch is stored as it is, the storing operations are simple, and therefore, description of the storing step is omitted herein.

First, telephone 1 in FIG. 2 is communicating with telephone 2 via switch (A), service line (A) of line (A), switch (B), service line (B) of line (B) and switch (C). Here, if a dialing operation (to dial the station number 13 and the private number of telephone 3) is performed in order for telephone 1 to call telephone 3 as an added telephone to perform a three-party communication, then connection controller 8 of switch (A) receives the dial information and reads out station information (station number=13) of telephone 2 in interconnection from the connected switch memory corresponding to telephone 1 to be connected to the added telephone (step 101).

Then, it is discriminated whether or not the station information (station number=13) read out from the connected switch memory coincides with the station number (station number=13) of switch (C), which accommodates added telephone 3, discriminated from the dial information (step 102).

In this instance, since coincidence is discriminated, connection request information of called telephone 2 and telephone 3 to be added is transmitted to switch (B) via control line (A). The connection request information includes the station number of switch (C) and the private number of telephone 3 (step 103).

Then, when switch (B) receives the connection request information, connection controller 9 discriminates that the station number included in the connection request information is not the station number of the self switch, and transmits the received connection request information as it is to switch (C) via control line (B) (step 104).

Then, when switch (C) receives the connection request information, connection controller 10 discriminates that the station number included in the connection request information is the station number of the self switch, and connects telephone 3 to be added to service line (B) of line (B) which is being used by telephone 2 which is the other party in the service (step 105). Consequently, telephones 1, 2 and 3 can effect a three-party communication using two lines (A) and (B).

It is to be noted that, while same flows as the flow of steps 101, 102, 103, 104, 105 and 106 are provided for switches (A), (B) and (C), description of them is omitted herein since operation is same although the positions of switches in which telephones are accommodated are different.

Next, as another example of connection, operation when, while telephone 1 shown in FIG. 2 is communicating with telephone 2 via switch (A), service line (A) of line (A), switch (B), service line (B) of line (B) and switch (C), a dialing operation is performed for telephone 1 to call telephone 4 as an added telephone in order to perform a three-party communication (dialing the station number 12 and the private line of telephone 4) is described.

First, connection controller 8 of switch (A) receives the dial information and reads out station information (station number=13) of telephone 2 in interconnection from the connected switch memory corresponding to telephone 1 to be connected to the added telephone (step 101).

Then, connection controller 8 discriminates whether or not the station information (station number=13) read out from the connected switch memory coincides with the station number of switch (B) (station number=12), in which added telephone 4 is accommodated, identified from the dial information (step 102).

In this instance, since the station information does not coincide with the station number of switch (B), connection controller 8 confirms whether or not the switch in which telephone 4 to be added is accommodated is self switch (A). Here, since the station number 12 has been received as a result of the dialing operation, connection controller 8 discriminates that the switch is not self switch (A) (step 106). If the added telephone is otherwise accommodated in switch (A), then the added telephone and service line (A) are connected to each other in step 107.

However, in this instance, since the switch in which the telephone to be added is accommodated is not the self switch, connection controller 8 reads out, from short distance memory 12, information corresponding to switch (B) in which added telephone 4 is accommodated and adjacent transit switch (B) interconnected to switch (B). In this instance, information 1 is read out (step 108).

Connection controller 8 thus discriminates that the information read out is 1 (information 1 =called switch is at a short distance) (step 109).

If the information read out is otherwise 0 (information 0=self switch is at a short distance), then connection controller 8 performs originating connection to another switch based on the dial information and connects a new line selected in step 110 and acquired by the origination to telephone 1. The reason why the originating connection is performed is that it is apparent in step 106 that the added telephone is accommodated in another switch.

Since the information is conversely 1 (information 1 =called switch is at a short distance), however, connection controller 8 transmits connection request information for telephone 4 to switch (B) via control line (A). This connection request information includes the station number of switch (B) and the private number of telephone 4 (step 111).

Then, connection controller 9 of switch (B) receives the connection request information, confirms that the switch in which added telephone 4 is accommodated is self switch (B). Since the received station number is 12, connection controller 9 discriminates that the switch in which added telephone 4 is accommodated is the self switch (step 112).

Then, connection controller 9 connects added telephone 4 to service line (A) of line (A) being used for the interconnection (step 113). Consequently, telephones 1, 2 and 4 can effect a three-party communication using two lines (A) and (B). If the switch in which the added telephone is accommodated is not conversely the self switch in step 112, then connection controller 9 reads out information from short distance memory 12 and discriminates its processing. Since the remaining part of the flow chart is the same as that described hereinabove, description of it is omitted here.

It is to be noted that, while the construction of the short distance memories in the present embodiment is described with reference to FIGS. 3(*a*) and 3(*b*) such that information 0 represents that the self switch is at a short distance whereas information 1 represents that the called switch is at a short distance, the representations of the information may otherwise depend upon the line use charge (accounted value) required when a line is used in place of the distance. In this instance, where the network is of the type wherein the line use charge varies depending upon the time zone, the present invention can be reduced to practice providing a plurality of short distance memories for different time zones.

Further, while a line between switches in the present embodiment is described as a fixed private line, the present invention can be reduced to practice even where a public network line which can be connected to any called switch is used.

In this instance, if a memory is provided for each public network line so that dial information for designating a called person when a first two-party communication connection is to be established and called switch information which is identified from originator information by an originator number notification service may be stored into the memory, transit switches of short distance memories can be used. Accordingly, different from the case wherein private lines are employed, all called switches make an object of storage as transit switches of short distance memories.

Further, similarly as in the case where private lines are employed, station information of a station of an added telephone office of a short distance memory and a connected switch memory is provided corresponding to dial information for designating a called person or persons for a two-party communication or a three-party communication.

Where a simple memory is provided for each public network line so that called switch information may be stored into the memory in this manner, the present invention can be reduced to practice also with a network which employs public network lines or another network in which public network lines and private lines are provided at random.

Further, while a short distance memory and a connected switch memory are provided for each switch in the present embodiment, in an alternative system which includes a host computer and a switch such that they can cooperate with each other, the present invention can be reduced to practice by providing both or one of a short distance memory and a connected switch memory in the host computer and communicating necessary information between the switch and the host computer.

Further, while it is described in the present embodiment that interconnection between a telephone (or a line) and a line is performed directly in order to facilitate understanding, generally a telephone is connected to a line in most cases using a line wire trunk apparatus or the like. Further, when a service is effected between or among a plurality of terminals, although such an apparatus as a three-party communication trunk or a conference trunk for exclusive use is sometimes interposed, in any case, there is no trouble in reducing the present invention to practice since basic operations which are performed making use of short distance memories and connected switch memories are similar.

Further, while description in the present embodiment is given of the case wherein a service changes from a two-party communication to a three-party communication, by modifying the method and the apparatus of the present invention, they can be applied to a communication of four or more parties.

In this instance, since the number of lines (transit switches) interconnected already to a telephone (or a line) of a self switch may possibly be two or more, the connected switch memory may be modified so as to allow storage of information of a plurality of stations for each terminal so that it may be retrieved whether or not the plurality of switches stored in the connected switch memory include a switch in which an added terminal is accommodated.

Further, it is only required to read out corresponding information of a plurality of transit switches in the short distance memory and transmit connection request information to one of the transit switches for which information 1 (the called switch is at a short distance) is found out first.

Furthermore, when it is desired to select that one of the plurality of transit switches of the short distance memory which is at the shortest distance to the added terminal, the corresponding information should not be limited to 0 and 1 but should include 2 or more. For example, the information may include information 0 (the self switch is at a short distance), information 1 (the called switch is at a short distance and besides at the shortest distance), information 2 (the called switch is at a short distance and besides at the second shortest distance) and information 3 (the called switch is at a short distance and besides at the third shortest distance). In this instance, if all of the corresponding information relating to the additional connection is information 0 (the self switch is at a short distance), then the self switch is discriminated to be at a short distance. In any other case, connection request information should be transmitted to one of called switches which has information of the lowest value.

According to the present invention, since the number of lines to be used when a plurality of terminals are connected to each other can be reduced, there is an effect that the probability that a line encounters an all busy condition is reduced. Consequently, services can be provided smoothly even where the number of lines installed is comparatively small, and reduction of the cost for the line equipments can be achieved.

What is claimed is:

1. A method of connecting terminals between switches wherein an originating terminal and a terminating terminal are connected to each other via a plurality of switches and lines, and an additional terminal is to be connected to a connection between the originating terminal and the terminating terminal, comprising the steps of:

storing information into a short distance memory of each of the said plurality of switches identifying a first switch of two switches connected by a line in said plurality of switches that said additional terminal is nearest to;

discriminating whether said first switch is an originating switch, a terminating switch or an associated transit switch; and adjusting the terminal connection between the two switches using the short distance memories and in response to said discriminating step so that, from among said associated transit switches and transit lines, a first line of said first switch which is nearest to the additional terminal to be connected may be connected to the additional terminal.

2. A method of connecting terminals between switches wherein an originating terminal and a terminating terminal are connected to each other via a plurality of switches and lines and an additional terminal is to be connected to a connection between the originating terminal and the terminating terminal, comprising the steps of:

storing information in a connected switch memory of each of said plurality of switches identifying a switch or switches in which a originating terminal or a terminating terminal are accommodated;

discriminating whether said first switch is an originating switch, a terminating switch or an associated transit switch; and adjusting connections between said plurality of switches using information stored in said connected switch memories and in response to said discriminating step so that, when one of the originating terminal and the terminating terminal and the additional terminal to be connected are accommodated in one of said plurality of switches, the line of the accommodating switch and the additional terminal to be connected may be connected to each other.

3. An apparatus for connecting terminals between switches wherein an originating terminal and a terminating terminal are connected to each other via a plurality of switches and lines, and an additional terminal is to be connected to a connection between the originating terminal and the terminating terminal comprising:

a short distance memory for each of the plurality of switches identifying a first switch of two switches connected by a line in said plurality of switches that said additional terminal is nearest to;

discriminating means for discriminating whether said first switch is an originating switch, a terminating switch or an associated transit switch; and means for adjusting the terminal connection between the two switches using the short distance memories and in response to said discriminating means so that, from among said associated transit switches and transit lines, a first line of said first switch which is nearest to the additional terminal to be connected may be connected to the additional terminal.

4. An apparatus for connecting terminals between switches wherein originating terminal and a terminating terminal are connected to each other via a plurality of switches and lines, and an additional terminal is to be connected to a connection between the originating terminal and the terminating terminal, comprising:

a connected switch memory for each of the said plurality of switches for storing information identifying a switch or switches from said plurality of switches in which a originating terminal or a terminating terminal are accommodated;

discriminating means for discriminating whether said first switch is an originating switch, a terminating switch or an associated transit switch;

means for adjusting the terminal connection between the plurality of switches using the connected switch memories and in response to said discriminating means so that, when one of the originating terminal and the terminating terminal and the additional terminal are accommodated in one of said plurality of switches, the line of the accommodating switch and the additional terminal to be connected may be connected to each other.

5. An apparatus for connecting terminals between switches as claimed in claim 3, wherein the short distance memory of each switch can identify a switch or switches that accommodates a originating terminal or a terminating terminal includes a short distance memory in which one of the switches which accommodates a terminal to be additionally connected to the originating terminal and terminating terminal interconnection and those transit switches via which the terminals are to be interconnected between said plurality of switches are stored in a corresponding relationship as fixed information wherein information 0 represents that the switch accommodating the originating terminal is at a short distance whereas information 1 represents that a switch accommodating the terminating terminal is at a short distance.

6. An apparatus for connecting terminals between switches as claimed in claim 4, wherein the connected switch memory of each switch can identify a switch or switches that accommodates a originating terminal or a terminating terminal of which one is a called terminal, includes a connected switch memory into which, for all terminals accommodated in the switch, station information of a called terminal in the interconnection is registered at any time and by and into which the station information is discriminated, when the called terminal is an originating terminal, from a dialing operation number upon origination, but when the called terminal is a terminating terminal, from information received by an originator number notification service and stored.

* * * * *